United States Patent
Almadi et al.

(10) Patent No.: US 11,985,022 B2
(45) Date of Patent: May 14, 2024

(54) SYSTEMS AND METHODS FOR MANAGING DEVICES ON A WIRELESS COMMUNICATIONS NETWORKS

(71) Applicant: Saudi Arabian Oil Company, Dhahran (SA)

(72) Inventors: Soloman M. Almadi, Dhahran (SA); Khalid Al-Usail, Dammam (SA); Abdullah Al-Nufaii, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 34 days.

(21) Appl. No.: 17/168,886

(22) Filed: Feb. 5, 2021

(65) Prior Publication Data
US 2022/0255788 A1 Aug. 11, 2022

(51) Int. Cl.
*H04L 41/0213* (2022.01)
*H04L 41/046* (2022.01)
*H04L 41/0806* (2022.01)

(52) U.S. Cl.
CPC ........ *H04L 41/0213* (2013.01); *H04L 41/046* (2013.01); *H04L 41/0806* (2013.01)

(58) Field of Classification Search
CPC ............... H04L 41/0213; H04L 41/046; H04L 41/0806
See application file for complete search history.

(56) References Cited

U.S. PATENT DOCUMENTS

| 7,058,012 B1* | 6/2006 | Chen ................... H04L 41/5054 370/258 |
| 2003/0055973 A1* | 3/2003 | Kryskow, Jr. ....... H04L 41/5019 709/226 |
| 2009/0059814 A1* | 3/2009 | Nixon ................... H04W 16/18 370/254 |
| 2010/0180016 A1* | 7/2010 | Bugwadia ........... H04L 41/0869 713/168 |
| 2011/0136478 A1 | 6/2011 | Trigui |
| 2011/0138032 A1* | 6/2011 | Dudkowski ......... H04L 41/0816 709/223 |

(Continued)

OTHER PUBLICATIONS

AirMagnet Survey User Guide, NetAlly, Oct. 2019, 382 pages.
(Continued)

*Primary Examiner* — Boris D Grijalva Lobos
*Assistant Examiner* — Timothy Sowa
(74) *Attorney, Agent, or Firm* — Fish & Richardson P.C.

(57) ABSTRACT

An example network management apparatus is configured to continuously monitor an environment for a plurality of wireless signals transmitted by a plurality of wireless network devices, and determine first data regarding the wireless network devices, including identifiers of the wireless network devices, locations of the wireless network devices, and network configurations of the wireless network devices. Further, the network management apparatus is configured to access second data regarding physical characteristics of the environment, determining one or more modifications of the network configurations of the wireless network devices, and transmit one or more commands to the wireless network devices to modify one or more of their respective network configurations.

19 Claims, 7 Drawing Sheets

(56) References Cited

U.S. PATENT DOCUMENTS

| | | | |
|---|---|---|---|
| 2012/0196527 A1* | 8/2012 | Lagrange | H04W 40/205 |
| | | | 455/9 |
| 2015/0245221 A1 | 8/2015 | Yiu et al. | |
| 2016/0234650 A1 | 8/2016 | Kats et al. | |
| 2019/0349254 A1 | 11/2019 | Nolan et al. | |
| 2020/0162330 A1* | 5/2020 | Vadapalli | H04L 41/0806 |
| 2020/0413459 A1 | 12/2020 | Yoon et al. | |

OTHER PUBLICATIONS

Ekahau Pro, Ekahau.com, 2020, 2 pages.
Sample VisiWave Site Survey Report, VisiWave, Aug. 2012, 23 pages.
PCT International Search Report and Written Opinion in International Appln. No. PCT/US2022/015274, dated May 17, 2022, 18 pages.

* cited by examiner

SYSTEMS AND METHODS FOR MANAGING DEVICES ON A WIRELESS COMMUNICATIONS NETWORKS

TECHNICAL FIELD

The disclosure relates to systems and methods for managing devices on a wireless communications network.

BACKGROUND

A wireless communications network enables computing devices to exchange information with one another via one or more wireless communications links. As an example, a computing device can transmit information intended for another computing device by encoding the information in a wireless signal and broadcasting the wireless signal into the ambient environment. Network equipment (such as a wireless access point or a wireless router) can receive the wireless signal from the ambient environment, decode the wireless signal to extract the information, and route the information to the intended computing device. As another example, the network equipment can receive information intended for a computing device, encode the information in a wireless signal, and broadcast the wireless signal into the ambient environment. The computing device can receive and decode the wireless signal to extract the information.

SUMMARY

This disclosure describes systems and methods for managing devices on a wireless communications network. In an example implementation, a wireless network management system can retrieve information regarding each of the devices of the wireless communication network, such as the identities, the locations, and the network configurations of each of the devices, and present the information to a user. Further, the wireless network management system can determine, based on the retrieved information, one or more modifications to the configuration of the wireless communications network to improve the performance of the wireless communications network. For example, the wireless network management system can determine that the performance of the wireless communications network can be improved by moving one or more of the devices to different locations or modifying the network configuration of more or more of the devices. In some implementations, the wireless network management system can automatically perform these modifications. In some implementations, the wireless network management system can present proposed modifications to a user and guide the user in performing the modifications manually.

In some implementations, the wireless network management system can be implemented as one or more stand-alone computer "appliances." For example, a computer appliance can be pre-configured (for example, during a manufacturing or production process) to perform particular operations for managing devices on a wireless communications network, such that those described in further detail below. A user can deploy the computer appliance by positioning the device in an operating environment having a wireless communication network, and providing power and network connectivity of the computer appliance. Upon deployment, the computer appliance can automatically perform at least some of the pre-configured operations, without requiring that a user manually install additional software or hardware. In some implementations, the computer appliance can automatically perform at least some of the pre-configured operations on a continuous basis (for example, according to a repeating or periodic schedule over an extended interval of time, such as hours, days, weeks, months, or years) unless powered down or instructed by a user to terminate the operations.

The implementations described in this disclosure can provide various technical benefits. For instance, a wireless network management system can improve the performance of a wireless communication network. As an example, the wireless network management system can be used to modify the configuration of a wireless communications network to improve the speed by which data is transmitted across the wireless communications network, enhance the communications range of the wireless communications network, eliminate or otherwise reduce coverage gaps in the wireless communicating network, and increase the overall reliability of the communications network. Further, the wireless network management system can be deployed in a "plug and play" manner, without requiring that a user perform a complex or tedious installation process.

In an aspect, a system includes a first network management apparatus. The network management apparatus includes a first housing, a first wireless transceiver secured to the first housing, one or more first processors disposed within the first housing, and one or more first non-transitory computer readable media disposed in the first housing. The one or more first non-transitory computer readable media store first instructions that, when executed by the one or more first processors, cause the one or more first processors to perform particular operations. The operations include continuously monitoring, using the first wireless transceiver, a first environment of the first network management apparatus for a plurality of first wireless signals, where the first wireless signals are transmitted by a plurality of first wireless network devices in the first environment; determining, based on the first wireless signals, first data regarding the first wireless network devices, where the first data includes, for each of the first wireless network devices: an identifier of the first wireless network device, a location of the first wireless network device in the first environment, and a network configuration of the first wireless network device; accessing second data regarding physical characteristics of the first environment; determining, based on the first data and the second data, one or more modifications of the network configurations of the first wireless network devices; and transmitting, to the first wireless network devices, one or more commands to modify one or more of the network configurations of the first wireless network devices.

Implementations of this aspect can include one or more of the following features.

In some implementations, the first network management apparatus can be configured to automatically perform at least some of the operations upon being switched on.

In some implementations, the first network management apparatus can be an appliance.

In some implementations, the network configuration of each of the first wireless network devices can include at least one of: a network address of the first wireless network device, a wireless operating frequency of the first wireless network device, or a wireless operating channel of the first wireless network device.

In some implementations, the first data can further include, for each of the first wireless network devices, an antenna configuration of the first wireless network device.

In some implementations, the antenna configuration of the first wireless network device can include at least one of a direction of an antenna of the first wireless network device, or a height of the antenna of the first wireless network device.

In some implementations, the second data can include at least one of: a location of a physical structure in the first environment, one or more physical dimensions of the physical structure, or an orientation of the physical structure.

In some implementations, the physical structure can be at least one of a wall, a floor, a ceiling, a pipe, a window, an item of furniture, or machinery.

In some implementations, the operations can further include determining whether one of the first wireless network devices is in a line of sight of another one of the first wireless network devices, and responsive to determining whether the one of the first wireless network devices is in a line of sight of another one of the first wireless network devices, presenting a notification to a user to move at least one of those first wireless network devices.

In some implementations, the operations can further include determining, for each of the first wireless network devices, respective distances between the first wireless network device and one or more other ones of the first wireless network devices; and responsive to determining the distances, presenting a notification to a user to move at least one of the first wireless network devices.

In some implementations, the operations can further include presenting a network map to a user, where the network map includes a three-dimensional graphical representation of the first environment, and a graphical representation of the location of each of the first wireless network devices in the first environment.

In some implementations, the network map can further include a graphical representation of at least a portion of the network configuration of each of the first wireless network devices.

In some implementations, the system can further include one or more antennas modules communicatively coupled to the wireless transceiver, where the one or more antennas modules are configured to: detect first wireless signals in the first environment, and provide an indication of the first wireless signals to the first wireless transceiver.

In some implementations, at least some of the one or more antennas modules can be remote from the first network management apparatus.

In some implementations, at least some of the one or more antennas modules can be secured to the first housing of the first network management apparatus.

In some implementations, at least one of the first wireless network devices can be an Internet of Things (IoT) or an Industrial Internet of Things (IIoT) device.

In some implementations, at least one of the first wireless network devices can be communicatively coupled to industrial machinery.

In some implementations, the first environment can be an industrial facility.

In some implementations, the system can include a second network management apparatus. The second network management apparatus can include a second housing, a second wireless transceiver secured to the second housing and including one or more second antennas, one or more second processors disposed within the second housing, and one or more second non-transitory computer readable media disposed in the second housing. The one or more second non-transitory computer readable media store second instructions that, when executed by the one or more processors, cause the one or more second processors to perform second operations. The operations include continuously monitoring, using the second wireless transceiver, a second environment of the second network management apparatus for a plurality of second wireless signals, where the second wireless signals are transmitted by a plurality of second wireless network devices in the second environment, and where the first environment is different from the second environment; determining, based on the second wireless signals, third data regarding the second wireless network devices, where the third data includes, for each of the second wireless network devices: an identifier of the second wireless network device, a location of the second wireless network device in the second environment, and a network configuration of the second wireless network device; accessing fourth data regarding physical characteristics of the second environment; determining, based on the third data and the fourth data, one or more modifications of the network configurations of the second wireless network devices; and transmitting, to the second wireless network devices, one or more second commands to modify one or more of the network configurations of the second wireless network devices.

In some implementations, the system can further include a control system remote from the first network management apparatus and the second network management apparatus, where the control system is communicatively coupled to the first network management apparatus and the second network management apparatus, and where the control system is configured to: receive the first data and the second data from the first network management apparatus; receive the third data and fourth second data from the second network management apparatus, determine, based on the first data and the second data, one or more additional modifications of the network configurations of the first wireless network devices; transmit, to the first network management apparatus, one or more additional commands to modify one or more of the network configurations of the first wireless network devices; and determine, based on the third data and the fourth data, one or more additional modifications of the network configurations of the second wireless network devices; transmit, to the second network management apparatus, one or more additional commands to modify one or more of the network configurations of the second wireless network devices.

In some implementations, the system can include a time server communicatively coupled to the first network management apparatus and to the first wireless network devices. The time server can be configured to provide a clock signal for synchronizing operations of the first network management apparatus and the first wireless network devices.

Other implementations are directed to systems, devices, and devices for performing some or all of the method. Other implementations are directed to one or more non-transitory computer-readable media including one or more sequences of instructions which when executed by one or more processors causes the performance of some or all of the method.

The details of one or more embodiments are set forth in the accompanying drawings and the description. Other features and advantages will be apparent from the description and drawings, and from the claims.

DETAILED DESCRIPTION

Figure 1:
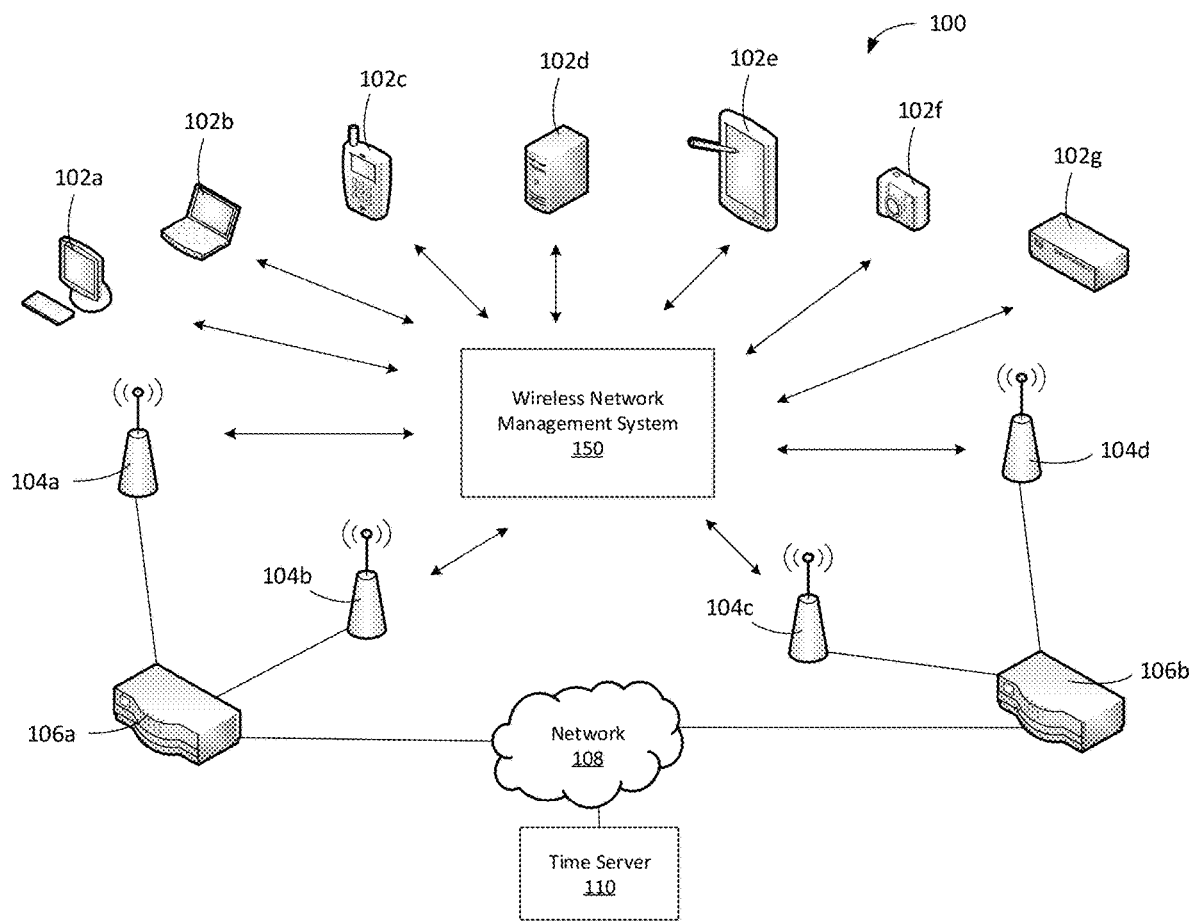
FIG. 1 is a diagram of an example system that enables information to be exchanged wirelessly between several computing devices.

FIG. 1 shows an example system 100 that enables information to be exchanged wirelessly between several computing devices 102a-102g. The system 100 includes the computing devices 102a-102g, several wireless access points 104a-104d, several routers 106a and 106b communicatively coupled to one another via a network 108, and a wireless network management system 150. Collectively, the system 100 can form a wireless communications network, such as a Wi-Fi network.

During an example operation of the system 100, each of the computing devices 102a-102g establishes one of more wireless communications links with one or more of the wireless access points 104a-104d. Each of the computing devices 102a-102g can transmit information to other ones of the computing devices 102a-102g (or other devices communicatively coupled to the network 108) via the wireless communications links. For example, a computing device 102a-102g encodes information in a wireless signal, and transmits the wireless signal over a wireless link to one of the wireless access points 104a-104d. The wireless access point 104a-104d receives the wireless signal, decodes the wireless signal to extract the information, and provides the information to a router 106a or 106b. The router 106a or 106b determines the intended destination of the information, and routes the information to the intended destination (for example, via the network 108, other routers 106a or 106b, and wireless access points 104a-104d).

Further, each of the computing devices 102a-102g can receive information from other ones of the computing devices 102a-102g (or other devices communicatively coupled to the network 108) via the wireless communications links. For example, a router 106a or 106b receives information intended for a particular computing device 102a-102g and routes the information to one or more of the wireless access points 104a-104d in proximity to the intended computer device 102a-102g. The wireless access point 104a-104d encodes the information in a wireless signal, and transmits the wireless signal into an environment of the intended computing device 102a-102g. The intended computing device 102a-102g receives the wireless signal, and decodes the wireless signal to extract the information.

Further, the system 100 includes a wireless network management system 150 configured to manage each of the other devices of the system 100. For instance, the wireless network management system 150 can retrieve information regarding each of the computing devices 102a-102g, wireless access point 104a-104d, routers 106a and 106b, or any of the devices of the network 108, and present the information to a user for review. As an example, the wireless network management system 150 can determine the identities, locations, and network configurations of each of these devices, and present a graphical user interface that displays at least some of this information to a user. This can be useful, for example, in enabling the user to better understand how the system 100 has been configured and deployed in a particular environment.

In some implementations, the wireless network management system 150 can automatically retrieve or access information regarding one of the devices of the system 100. For example, the wireless network management system 150 can be communicatively coupled to one of the devices of the system 100 via wireless and/or wired communications links, and automatically retrieve information regarding each of the devices directly from those devices. As another example, the wireless network management system 150 can be communicatively coupled to a database that stores information regarding one or more of the devices of the system 100, and automatically retrieve information regarding each of the devices directly from the database.

In some implementations, the wireless network management system 150 can obtain information regarding one of the devices of the system 100 based on manual input from a user. For example, the wireless network management system 150 can present a graphical user interface to a user with data entry fields, selectable elements, or other interactive elements that enable a user to provide information regarding one or more of the devices to the wireless network management system 150

Further, the wireless network management system 150 can determine, based on the retrieved information, one or more modifications to the devices of the system 100 to improve the performance of the system 100. For example, the wireless network management system 150 can determine that the system 100 can be improved by moving one or more of the devices to different locations or modifying the network configuration of more or more of the devices.

This can be beneficial, for example, in improving the performance of a system 100. As an example, the wireless network management system 150 can be used to modify the configuration of a system 100 to improve the speed by which data is transmitted between devices wirelessly, enhance the communications range of the system 100, eliminate or otherwise reduce coverage gaps in the system 100, and increase the overall reliability of the system 100.

In some implementations, can automatically perform these modifications. For example, the wireless network management system 150 can generate commands to modify the network configuration of one or more of the devices, and transmit the command to the appropriate devices for execution (for example, via one or more wired and/or wireless links).

In some implementations, the wireless network management system 150 can present proposed modifications to a user and guide the user in performing the modifications manually. For example, the wireless network management system 150 can present a graphical user interface that includes instructions to relocate a particular device from one location to another. As another example, the wireless network management system 150 can present a graphical user interface that includes instructions to modify a network configuration of a particular device.

In some implementations, the wireless network management system can be implemented as one or more stand-alone computer "appliances." For example, a computer appliance can be pre-configured (for example, during a manufacturing or production process) to perform particular operations for managing devices on a wireless communications network, such that those described in further detail below. A user can deploy the computer appliance by positioning the device in an operating environment having a wireless communication network, and providing power and network connectivity to the computer appliance. Upon deployment, the computer appliance can automatically perform at last some of the pre-configured operations, without requiring that a user manually install additional software or hardware. This can be beneficial, for example, as it enables the wireless network management system 150 to be deployed in an automated and "plug and play" manner, without requiring that a user perform a complex or tedious installation process.

Example operations of the wireless network management system 150 are described in further detail below.

The computing devices 102a-102g can include any number of electronic devices that are configured to receive, process, and transmit data wirelessly. Examples of the computing devices 102a-102g include client computing devices (such as desktop computers or notebook computers), server computing devices (such as server computers or cloud computing systems), mobile computing devices (such as cellular phones, smartphones, tablets, personal data assistants, notebook computers with networking capability), wearable computing devices (such as a smart phone or a headset), cameras, sensors, network-enabled industrial equipment or machinery, network-enabled appliances, or any other devices capable of receiving, processing, and transmitting data wirelessly.

Further, in some implementations, at least some of the computing devices 102a-102g can be Internet of Things (IoT) devices and/or Industrial Internet of Things (IIoT) devices. For example, at least some of the computing devices 102a-102g can include sensors, instruments, and other devices that are networked together to perform industrial processes, such as manufacturing and energy management. As another example, at least some of the computing devices 102a-102g can facilitate the performance of industrial processes in the fields of petrochemical exploration and processing, energy production, manufacturing, agriculture, automobiles, aviation, or any other industry. In some implementations, the computing devices 102a-102g can be deployed in a strictly industrial setting (for example, a factory or industrial plant), rather than in home or administrative office settings. In some implementations, the computing devices 102a-102g can be deployed in multiple settings concurrently, such as a combination of industrial, home, and/or administrative office settings. Further, the computing devices 102a-102g can be deployed in indoor settings, outdoor settings, or both.

In some implementations, the computing devices 102a-102g can include devices that operate using one or more operating systems (as examples, MICROSOFT® WINDOWS®, APPLE® MACOS®, LINUX®, UNIX®, GOOGLE® ANDROID®, AND APPLE® IOS®, among others) and one or more architectures (as examples, x86, POWERPC®, and ARM®, among others). In some implementations, one or more of the computing devices 102a-102g need not be located locally with respect to the rest of the system 100, and one or more of the computing devices 102a-102g can be located in one or more remote physical locations.

In some implementations, a computing device 102a-102g can include a wireless transceiver (for example, having one or more wireless radios and antennas) to transmit wireless to and receive wireless signals from the ambient environment. For example, a wireless transceiver can be used to transmit data wirelessly to a nearby wireless access point 104a-104d. As another example, a wireless transceiver can be used to receive data wireless from a nearby wireless access 104b. In some implementations, the wireless transceivers can operate in accordance with one or more technical standards. For example, the wireless transceivers can operate in accordance with one or more WI-FI™ technical standards, as defined by the INSTITUTE OF ELECTRICAL AND ELECTRONICS ENGINEERS®. Example WI-FI™ technical standards include IEEE 802.11A™, IEEE 802.11B™, IEEE 802.11G™, IEEE 802.11N™, IEEE 802.11AC™, IEEE 802.11AD™, IEEE 802.11AF™, IEEE 802.11AH™, IEEE 802.11AI™, IEEE 802.11AJ™, IEEE 802.11AQ™, IEEE 802.11AX™, IEEE 802.11AY™, IEEE 802.11BA™, AND IEEE 802.11BE™, among others. In some implementations, the wireless transceivers can include narrowband radio systems, broadband wireless system, systems that facilitate formation of low power wireless networks, or a combination of two or more of these systems.

The wireless access points 104a-104d are networking hardware devices that are configured to form wireless communications links between one of the computing devices 102a-102g and other networking equipment (for example, the wireless network management system 150, a router 106a or 106b, or other devices of the network 108). In some implementations, a wireless access point 104a-104d can include a wireless transceiver (for example, having one or more wireless radios and antennas) to transmit and receive wireless signals from the ambient environment. For example, a wireless transceiver can be used to transmit data wirelessly to the wireless network management system 150 and/or nearby computing device 102a-102g. As another example, a wireless transceiver can be used to receive data wirelessly from the wireless network management system 150 and/or a nearby computing device 102a-102g. In some implementations, the wireless transceivers can operate in accordance with one or more technical standards. For example, the wireless transceivers can operate in accordance with one or more WI-FI™ technical standards, as defined by the INSTITUTE OF ELECTRICAL AND ELECTRONICS ENGINEERS®. Example WI-FI™ technical standards include IEEE 802.11A™, IEEE 802.11B™, IEEE 802.11G™, IEEE 802.11N™, IEEE 802.11AC™, IEEE 802.11AD™, IEEE 802.11AF™, IEEE 802.11AH™, IEEE 802.11AI™, IEEE 802.11AJ™, IEEE 802.11AQ™, IEEE 802.11AX™, IEEE 802.11AY™, IEEE 802.11BA™, AND IEEE 802.11BE™, among others.

The routers 106a and 106b are network hardware devices that are configured to direct data traffic between devices of the system 100. As an example, a router can receive data intended for a particular device, ascertain the intended destination of the data, and direct the data to the intended device (or one or more intermediary devices) to facilitate the delivery of the data to the intended destination. In some implementations, a router can be communicatively coupled to other devices of the system 100 (for example, the wireless network management system 150, the wireless access points 104a-104d, other routers, and/or the network 108) via one or more wired and/or wireless connections.

The network 108 can be any communications network through which data can be transferred and shared. For example, the network 108 can be a local area network (LAN) or a wide-area network (WAN), such as the Internet. The network 108 can be implemented using various networking interfaces, for instance wireless networking interfaces (such as Wi-Fi, Bluetooth, or infrared) or wired networking interfaces (such as Ethernet or serial connection). The network 108 also can include combinations of more than one network, and can be implemented using one or more networking interfaces.

In some implementations, the network 108 can include network hardware equipment to facility the transfer and sharing of data. Example network hardware includes routers, switches, gateways, bridges, repeaters, repeater hubs, access points, servers, firewalls, modem, and line drivers.

In some implementations, some or all of the devices of the system 100 can operate in accordance with one or more uniform timing sources. For example, the internal clocks of some or all of the devices of the system 100 can be synchronized using a time server 110, such that the devices transmit, receive, and/or process data according to a common clock. In some implementations, a time server 110 can be included as a part of the network 108, or as another device (for example, a stand-alone computer server that is communicatively coupled to one or more of the devices of the system 100).

Figure 2:
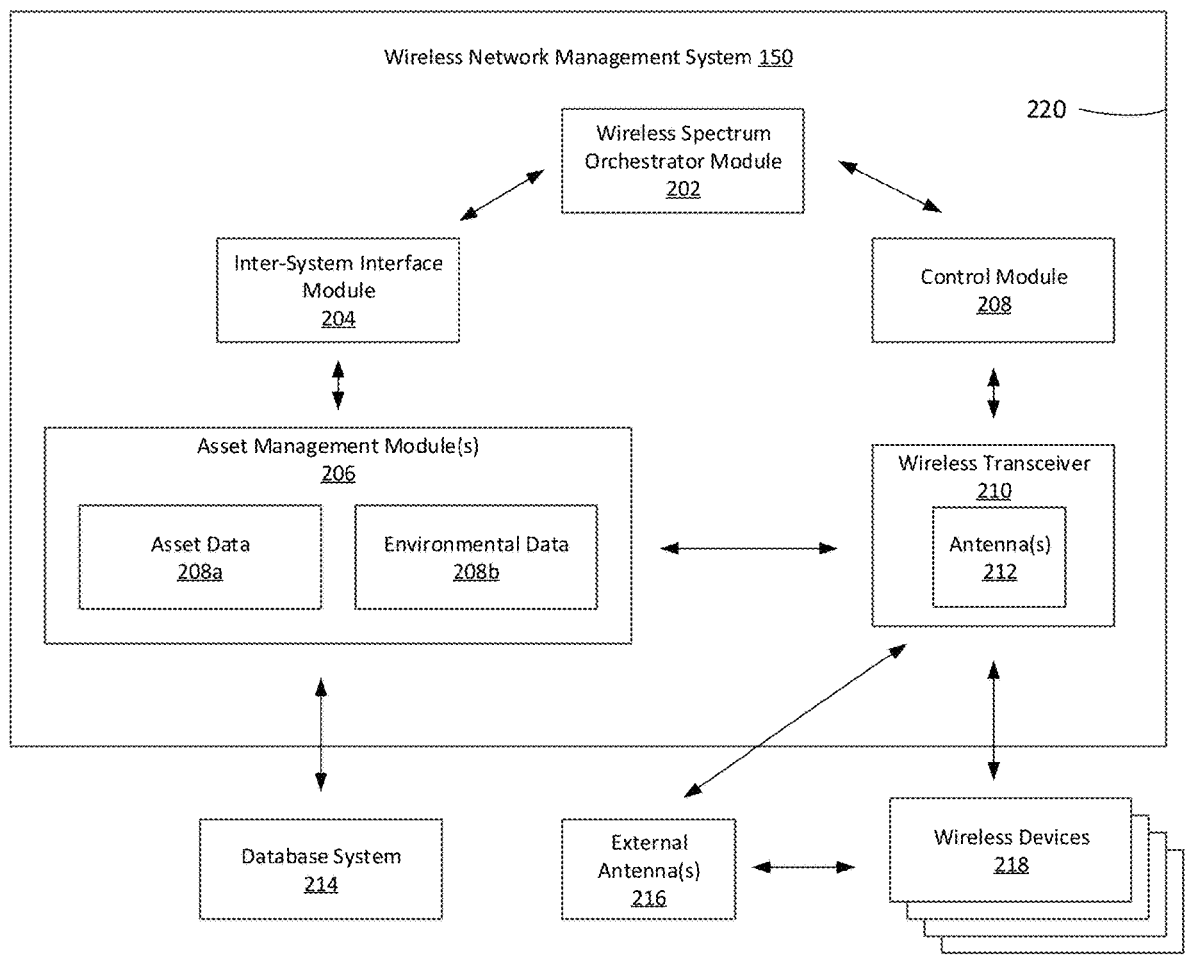
FIG. 2 is a diagram of an example wireless network management system.

FIG. 2 shows the wireless network management system 150 in greater detail. The wireless network management system 150 includes a wireless spectrum orchestrator module 202, an inter-system interface module 204, an asset management module 206, a control module 208, and a wireless transceiver 210. Each of the modules 202, 204, 206, 208, and 210 can be implemented as one or more groups of digital electronic circuitry, computer software, firmware, or hardware, or in combinations of one or more of them.

As described above, the wireless network management system 150 can be implemented as one or more stand-alone computer "appliances." For example, some or all of the modules 202, 204, 206, 208, and 210 can be enclosed within a common housing or enclosure 220, such that the wireless network management system 150 is provided as a single physical device that can be readily deployed to a particular location and re-located to different locations. Further, each of the modules 202, 204, 206, 208, and 210 can be pre-configured (for example, during a manufacturing or production process for the wireless network management system 150) to perform particular operations for managing devices on a wireless communications network. A user can deploy the wireless network management system 150 by positioning the wireless network management system 150 in an operating environment having a wireless communication network, and providing power and network connectivity of the wireless network management system 150. Upon deployment, the wireless network management system 150 can automatically perform at least some of the pre-configured operations, without requiring that a user manually install additional software or hardware. In some implementations, upon being switched or powered on, the wireless network management system 150 can automatically perform at least some of the pre-configured operations on a continuous basis (for example, according to a repeating or periodic schedule over an extended interval of time, such as hours, days, weeks, months, or years) unless powered down or instructed by a user to terminate the operations.

During an example operation of the wireless network management system 150, the asset management module 206 collects asset data 208a regarding each of the wireless devices 218 in an environment (for example, an environment of the wireless network management system 150).

As an example, asset data 208a for a wireless device 218 can include identifying information for the wireless device 218. For instance, asset data 208a for a wireless device 218 can include a unique identifier associated with the wireless device 218. As another example, asset data 208a for a wireless device 218 can indicate a system type, of the wireless device 218 (for example, whether the device is a Wireless Protocol International Society of Automation (ISA) 100.11a device, a wireless HIGHWAY ADDRESSABLE REMOTE TRANSDUCER PROTOCOL® (HART®) device, or a BLUETOOTH® device. As further examples, asset data 208a for a wireless device 218 can indicate of a manufacturer of the wireless device 218, a model number of the wireless device 218, a software version of the wireless device 218, and a project number associated with the wireless device 218. As another example, asset data 208a for a wireless device 218 can indicate an application type related to a process application for controlling and/or monitoring the wireless device 218.

As further examples, asset data 208a for a wireless device 218 can include information regarding a network configuration of the wireless device 218. For instance, asset data 208a for a wireless device 218 can include a media access control (MAC) address of the wireless device 218, an internet protocol (IP) address of the wireless device 218, a wireless operating frequency of the wireless device 218 (for example, a frequency with which the wireless device 218 is broadcasting and/or receiving wireless signals), and a wireless frequency channel of the wireless device 218 (for example, a channel with which the wireless device 218 is broadcasting and/or receiving wireless signals).

As further examples, asset data 208a for a wireless device 218 can include information regarding one or more antennas of the wireless device 218. For instance, asset data 208a for a wireless device 218 can include an indication of the type of the antenna, a direction or orientation of an antenna, and a pole height of the antenna.

As further examples, asset data 208a for a wireless device 218 can include information regarding a location at which the wireless device 218 is deployed or installed. For instance, asset data 208a for a wireless device 218 can include an indication of the site at which the wireless device 218 installed (for example, a particular building or facility), an indication of the zone of the facility in which the wireless device 218 installed (for example, a particular floor, wing, or room of a building), and an indication of the precise location at which the wireless device 218 installed (for example, geographical coordinates).

In some implementations, the wireless devices 218 can store information regarding themselves, and the asset management module 206 can obtain at least some of the asset data 208a from each of the wireless devices 218 directly. For example, the asset management module 206 can be communicatively coupled to one or more of the wireless devices 218 though a wireless transceiver 210 that includes an internal antenna 212 and/or is communicatively coupled to an external antenna 216. The wireless transceiver 210 can transmit a command to each of the wireless devices 218 to respond with information regarding that wireless device 218 (for example, a command to a wireless device 218 to transmit wireless signals that include information stored by that wireless device 218). Further, the wireless transceiver 210 can receive the response from the wireless device 218, and provide the information to the asset management module 206.

In some implementations, the asset management module 206 can determine at least some of the asset data 208a based on the characteristics of wireless signals transmitted by each of the wireless devices 218. For example, the asset management module 206 can use the wireless transceiver 210 to determine the strength of wireless signals transmitted by each of the wireless devices 218 and the direction from which the wireless signals were transmitted. Based on this information, the asset management module 206 can estimate the location of each of the wireless devices 218, such as by signal triangulation or other techniques. As another example, the asset management module 206 can determine the network configurations of the wireless devices 218 based on wireless signals transmitted by the wireless devices 218. For example, based on the wireless signals transmitted by the wireless devices 218, the asset management module 206 can determine MAC address of the wireless device 218, an IP address of the wireless device 218, an operating frequency of the wireless device 218, and/or a frequency channel of the wireless device 218. In some implementations, the asset management module 206 can determine at least some of this information based on a spectral analysis of the wireless signals in the environment.

In some implementations, a database system 214 external to the wireless network management system 150 can store information regarding at least some of the wireless devices 218, and the asset management module 206 can obtain at least some of the asset data 208a from the database system 214. In some implementations, the information stored in the database system 214 can be obtained from the wireless devices 218 and/or determined based on wireless signals transmitted by the wireless devices 218. In some implementations, the information stored in the database system 214 can be manually input by one or more users (for example, via a graphical user interface provided by the database system 214).

In some implementations, a user can manually input at least some of the asset data 208a into the wireless network management system 150 (for example, via a graphical user interface provided by the wireless network management system 150).

During an example operation of the wireless network management system 150, the asset management module 206 also collects environmental data 208b regarding the environment of the wireless devices 218.

As an example, environmental data 208b can include information regarding the floor plan or physical configuration of the environment. For example, the environmental data 208b can indicate the location and orientation of one or more physical structures within the environment, such as walls, doors, windows, pipes, conduits, rooms, items of furniture, and/or machinery (for example, electromechanical machinery) in the environment. In some implementations, the location and orientation of a physical structure can be expressed, at least in part, according to a reference coordinate frame (for example, geographical coordinates). In some implementations, the location and orientation of a physical structure can be expressed, at least in part, according to logical divisions of a building (for example, a floor of a building, plant, factory, or facility). In some implementations, the location and orientation of a physical structure can be expressed, at least in part, relative to those of another physical structure and/or the wireless devices 218. Further, the environmental data 208b can indicate the physical dimensions of the physical structures, such as the height, width, thickness, and shape of each of the physical structures.

In some implementations, the database system 214 external to the wireless network management system 150 can store information regarding the environment, and the asset management module 206 can obtain at least some of the environmental data 208b from the database system 214. In some implementations, the information stored in the database system 214 can be obtained from one or more floor plans or computer aided design (CAD) models of the physical environment. In some implementations, the information stored in the database system 214 can be manually input by one or more users (for example, via a graphical user interface provided by the database system 214).

In some implementations, a user can manually input at least some of the environmental data 208b into the wireless network management system 150 (for example, via a graphical user interface provided by the wireless network management system 150).

Although FIG. 2 depicts the wireless network management system 150 as having a single asset management module 206, this need not always be the case. For example, in some implementations, the wireless network management system 150 can include multiple asset management modules 206, each configured to obtain information regarding different groups of wireless devices 218 and/or environments.

The wireless network management system 150 also includes an intersystem interface module 204 configured to exchange data between the asset management module 206 and the wireless spectrum orchestrator module 202. In some implementations, the inter-system interface module 204 can be configured to exchange data according to one or more interfaces or protocols, such as SIMPLE NETWORK MANAGEMENT SYSTEM™ (SNMP™), OBJECT LINKING & EMBEDDING FOR PROCESS CONTROL™ (OPC™), Server-to-Server communications, relational databases, and Asset Management Systems among others. In some implementations, the inter-system interface module 204 can be compatible with protocols such as MODBUS® or Distributed Network Protocol 3 (DNP3) to facilitate the exchange of data.

In some implementations, the inter-system interface module 204 can be configured to exchange data between the asset management module 206 and the wireless spectrum orchestrator module 202 in real-time or substantially real time. In some implementations, the inter-system interface module 204 can be configured to exchange data between the asset management module 206 and the wireless spectrum orchestrator module 202 according to a recurring or periodic schedule. In some implementations, the inter-system interface module 204 can be configured to exchange data between the asset management module 206 and the wireless spectrum orchestrator module 202 in response to a command to do so, for example a command issued by a user or the wireless spectrum orchestrator module 202.

The wireless spectrum orchestrator module 202 receives data from the inter-system interface module 204, and processes the data to facilitate management of the wireless devices 218.

In some implementations, the wireless spectrum orchestrator module 202 can process the data received from the inter-system interface module 204, and present at least some of the processed data to a user for review. As an example, the wireless spectrum orchestrator module 202 can generate a graphical user interface that includes information regarding one or more of the wireless devices 218 (for example, at least a portion of the asset data 208a) and/or information regarding the environment of the wireless devices 218 (for example, at least a portion of the environmental data 208b).

Figure 3A:
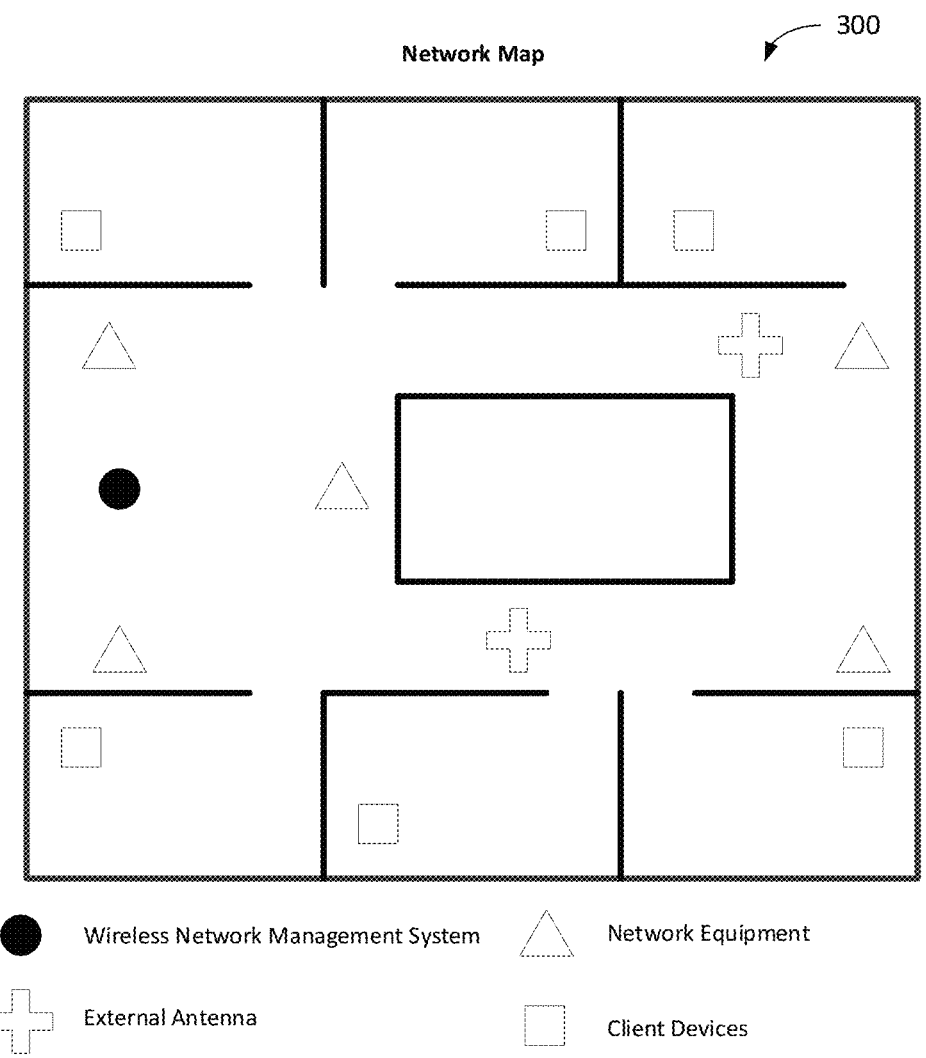
FIGS. 3A and 3B are diagrams of example graphical network maps.

In some implementations, the wireless spectrum orchestrator module 202 can generate a graphical network map depicting the wireless devices 218 within the environment. As an example, FIG. 3A shows a graphical network map 300 that depicts the location of each of the wireless devices 218 of a wireless network in the environment, including the wireless network management system 150, network equipment (for example, wireless access points 104a-104d, routers 106a and 106, or other devices in the network 108), client devices (for example, computing devices 102a-102g), and external antennas 216. Further, the graphical network map 300 depicts locations, orientations, and physical dimensions of each of the physical structures in the environment, such as walls, doors, windows, pipes, conduits, rooms, items of furniture, and/or machinery in the environment.

In some implementations, a graphical network map can be generated in real-time or substantially real-time, such that it reflects the current conditions of each of the wireless devices of the wireless network. Further, in some implementations, a user can "drill down" to specific devices or locations (for example, by zooming into particular portion of the graphical network map) to review information regarding a sub-set of the wireless devices and/or a portion of the overall environment.

Figure 3B:
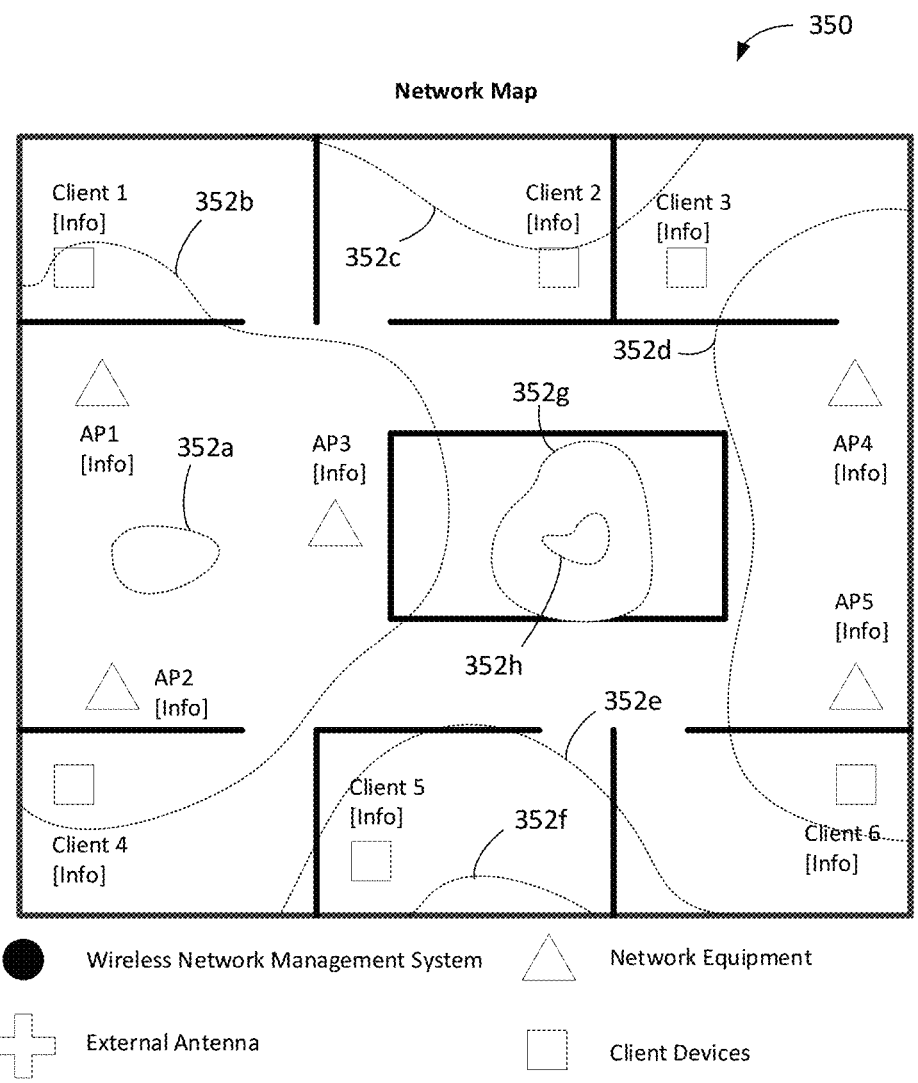

In some implementations, the wireless spectrum orchestrator module 202 can generate a graphical network map that includes an overlay with additional information regarding the wireless devices 218 and/or the environment. As an example, FIG. 3B shows another graphical network map 350 that depicts the location of each of the wireless devices 218 of a wireless network in the environment, as well as the locations, orientations, and physical dimensions of each of the physical structures in the environment. Further, graphical network map 350 includes overlays alongside each of the wireless devices indicating further information regarding that wireless device (for example, the identity of the wireless device and additional information regarding the wireless device, such as some or all of the asset data 208a corresponding to the wireless device). In some implementations, a user can select one of the wireless devices to obtain further information regarding the selected wireless device (for example, further information from the asset data 208a).

Further, the graphical network map 350 can include an overlay showing one or more contour lines or zones that indicate a signal coverage or signal strength of the access points of the wireless communications network (for example, the wireless access points 104a-104d). As an example, the contour lines 352a-352d can indicate the signal strength of wireless signals transmitted by the access points across the environment (for example, by indicating contiguous locations having equal or approximately equal signal strengths), or gaps in signal coverage of the access points.

In some implementations, a graphical network map can be generated according to two-dimensional perspective (for example, a top-down perspective). In some implementations, a graphical network map can be generated according to three-dimensional perspective. In some implementations, a graphical network map can be generated according to four or more dimensional perspective (for example, three spatial dimensions, a time dimension, and/or one or more other dimensions of data).

Graphical network maps can be beneficial, for example, in enabling a user to better understand the configuration of the wireless devices of a wireless communications network. For example, the graphical network map can be generated such that it resembles the actual appearance of a particular environment, including to scale presentations of the structures of a building, the logical division of the building, and the devices that are located in the building. Based on a graphical network map, a user can intuitively determine the location of each of the wireless devices within the network environment and identify potential problems with the deployment of the wireless devices (for example, poor or non-existent signal coverage).

In some implementations, the wireless spectrum orchestrator module 202 can continuously obtain information regarding the wireless devices and/or the environment, and continuously update the graphical network map based on the obtained information. For example, the wireless spectrum orchestrator module 202 can obtain information regarding the wireless devices and/or the environment according to a repeating or periodic schedule over an extended interval of time (for example, hours, days, weeks, months, or years), and update the graphical network map according to a repeating or periodic schedule based on the obtained information.

In some implementations, the wireless spectrum orchestrator module 202 can process the data received from the inter-system interface module 204, and determine one or more modifications to the configurations of the wireless devices 218 to improve the performance of the wireless communication network.

As an example, based on information received from the inter-system interface module 204, the wireless spectrum orchestrator module 202 can determine the wireless operating frequencies of each of the wireless devices 218 (for example, the frequencies with which the wireless devices 218 are broadcasting and/or receiving wireless signals) and/or the wireless frequency channels of each of the wireless devices 218 (for example, the channels with which the wireless devices 218 are broadcasting and/or receiving wireless signals). Further, the wireless spectrum orchestrator module 202 can determine whether one or more of the wireless devices 218 should be assigned different wireless operating frequencies and/or a wireless frequency channels for use. For example, if a particular wireless frequency and/or channel has been assigned for use to too many wireless devices 218 in a particular location (for example, greater than a particular threshold number), the wireless spectrum orchestrator module 202 can determine that one or more of the wireless devices 218 should be assigned a different wireless frequency and/or channel for use instead. In some implementations, the wireless spectrum orchestrator module 202 can determine that the wireless devices 218 at a particular location should be assigned to particular set of wireless frequencies and/or channels, such that the assignments are evenly distributed across a particular wireless spectrum (for example, a wireless spectrum available for use for Wi-Fi communications). This can be beneficial, for example, in reducing congestion on the wireless communications network, improving the reliability of the wireless communications network, and/or increasing the data throughput across the wireless communications network.

As another example, based on information received from the inter-system interface module 204, the wireless spectrum orchestrator module 202 can determine the network addresses of each of the wireless devices 218 (for example, the IP addresses of the wireless devices 218). Further, the wireless spectrum orchestrator module 202 can determine whether one or more of the wireless devices 218 should be assigned different network address. For example, if two wireless devices 218 can be assigned the same network address, the wireless spectrum orchestrator module 202 can determine that the network address for at least one of the wireless devices 218 should be modified. This can be beneficial, for example, in reducing misconfigurations on the wireless communications network.

As another example, based on information received from the inter-system interface module 204, the wireless spectrum orchestrator module 202 can determine the location of each of the wireless devices 218 relative to one another. Further, the wireless spectrum orchestrator module 202 can determine whether one or more of the wireless devices 218 should be re-located to a different location to improve their performance. This can be beneficial, for example, in enhancing the signal coverage of the wireless communications network and improving the reliability of the wireless communications network.

For example, if a particular wireless access point 104a-104d does not adequately provide signal coverage to one or more computing devices 102a-102g, the wireless spectrum orchestrator module 202 can determine a new location for the wireless access point 104a-104d that provides different signal coverage.

As another example, if a particular computing device 102a-102g is out of range of any wireless access points 104a-104d, the wireless spectrum orchestrator module 202 can determine a new location for the computing device 102a-102g that is in range of a wireless access point 104a-104d.

As another example, if two wireless access point 104a-104d are sufficiently close to one another, such that they provide redundant or substantially overlapping signal coverage, the wireless spectrum orchestrator module 202 can determine a new location for one of the wireless access point 104a-104d that provides signal coverage having less of an overlap or redundancy.

As another example, the wireless spectrum orchestrator module 202 can determine optimal locations for several wireless access point 104a-104d to deploy a "mesh" wireless network configuration. For instance, the wireless spectrum orchestrator module 202 can determine locations for each of the wireless access points 104a-104d, such that each the wireless access points 104a-104d in range of one or more other wireless access points 104a-104d. This enables the wireless access points 104a-104d to form wireless communications links between them according to a mesh arrangement.

As another example, the wireless spectrum orchestrator module 202 can determine that one or more physical structures are blocking a line-of-sight between two or more of the wireless devices 218, which might obstruct or otherwise negative impact the transmission of wireless signals between them. Based on this determination, the wireless spectrum orchestrator module 202 can determine a new location for one of the wireless devices 218 such that a line-of-sight exists between the wireless devices 218. For example, if a line-of-sight between a wireless access point 104a-104d and a computing device 102a-102g is blocked by a wall, door, window, pipe, conduit, item of furniture, and/or machinery, the wireless spectrum orchestrator module 202 can identify a new location for the wireless access point 104a-104d and/or the computing device 102a-102g such that a line-of-sight is exists between them.

In some implementations, the wireless network management system 150 can automatically perform the modifications identified by the wireless spectrum orchestrator module 202. For example, the wireless network management system 150 can use the control module 208 to generate commands to modify the network configuration of one or more of the wireless devices 218, and use the wireless transceiver 210 to transmit the command to the wireless devices 218 for execution.

In some implementations, the wireless spectrum orchestrator module 202 can present the modifications identified by the wireless spectrum orchestrator module 202 to a user and guide the user in performing the modifications manually. For example, the wireless network management system 150 can present a graphical user interface that includes instructions to perform the modifications (for example, a step-by-step set of instructions that can be followed by the user to change the network configurations antenna configurations, and/or locations of one or more of the wireless devices 218).

In the example shown in FIG. 1, a single wireless network management system 150 can manage each of devices on a wireless communications network. However, this need not be the case. For example, in some implementations, multiple wireless network management systems 150 can be used to manage devices on one more wireless communications networks concurrently.

Figure 4:
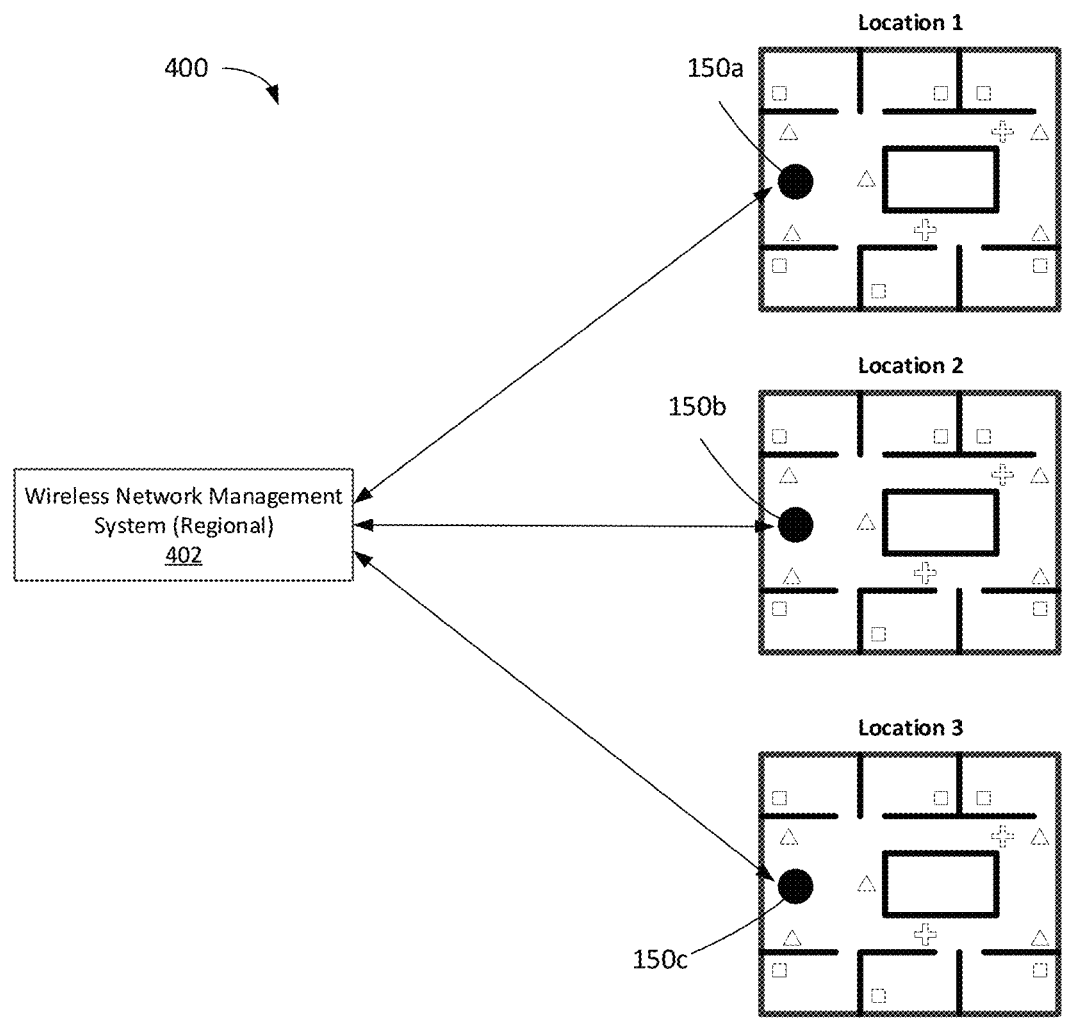
FIG. 4 is a diagram of an example system for managing wireless devices in multiple locations.

For instance, FIG. 4 shows an example system 400 for managing wireless devices in multiple locations. In this example, a first wireless network management system 150a is deployed at a Location 1, a second wireless network management system 150b is deployed at a different Location 2, and a third wireless network management system 150 is deployed at a different Location 3. In some implementations, the Locations 1-3 can represent different floors of a building, different wings of a building, different buildings in a site, or different sites entirely.

In some implementations, each of the wireless network management systems 150a-150b can perform a similar manner as described above (for example, with reference to FIGS. 1-3B). For example, each of the wireless network management systems 150a-150b can gather information regarding the wireless devices at its respective location, present the gathered information to one or more users, and manage the wireless devices at the respective location based on the gather information.

Further, a regional wireless network management system 402 can be communicatively coupled to each of the wireless network management systems 150a-150c (for example, via one or more wired and/or wireless links), and control the operation of each of the wireless network management systems 150a-150c. For example, the regional wireless network management system 402 can receive information gathered by wireless network management systems 150a-150c and present the gathered information to one or more users. Further, the regional wireless network management system 402 can manage the wireless devices at each of the locations based on the gather information. For example, the regional wireless network management system 402 can generate commands to modify the configurations of one or more of the wireless devices at any of the locations, and provide the commands to the wireless devices (either directly or via one of the wireless network management systems 150a-150c as an intermediary. As another example, the regional wireless network management system 402 generate instructions to a user to assist in the modification of the configurations of one or more of the wireless devices at any of the locations, and present the instructions to the user (for example, using a graphical user interface).

Although FIG. 4 shows an example system 400 having three wireless network management systems 150a-150c and a single regional wireless network management systems 402, this need always be the case. In practice, a system can include any number of wireless network management systems and regional wireless network management systems working in concert with one another to manage the operation of any number of wireless devices in any number of locations.

Example Processes

Figure 5:
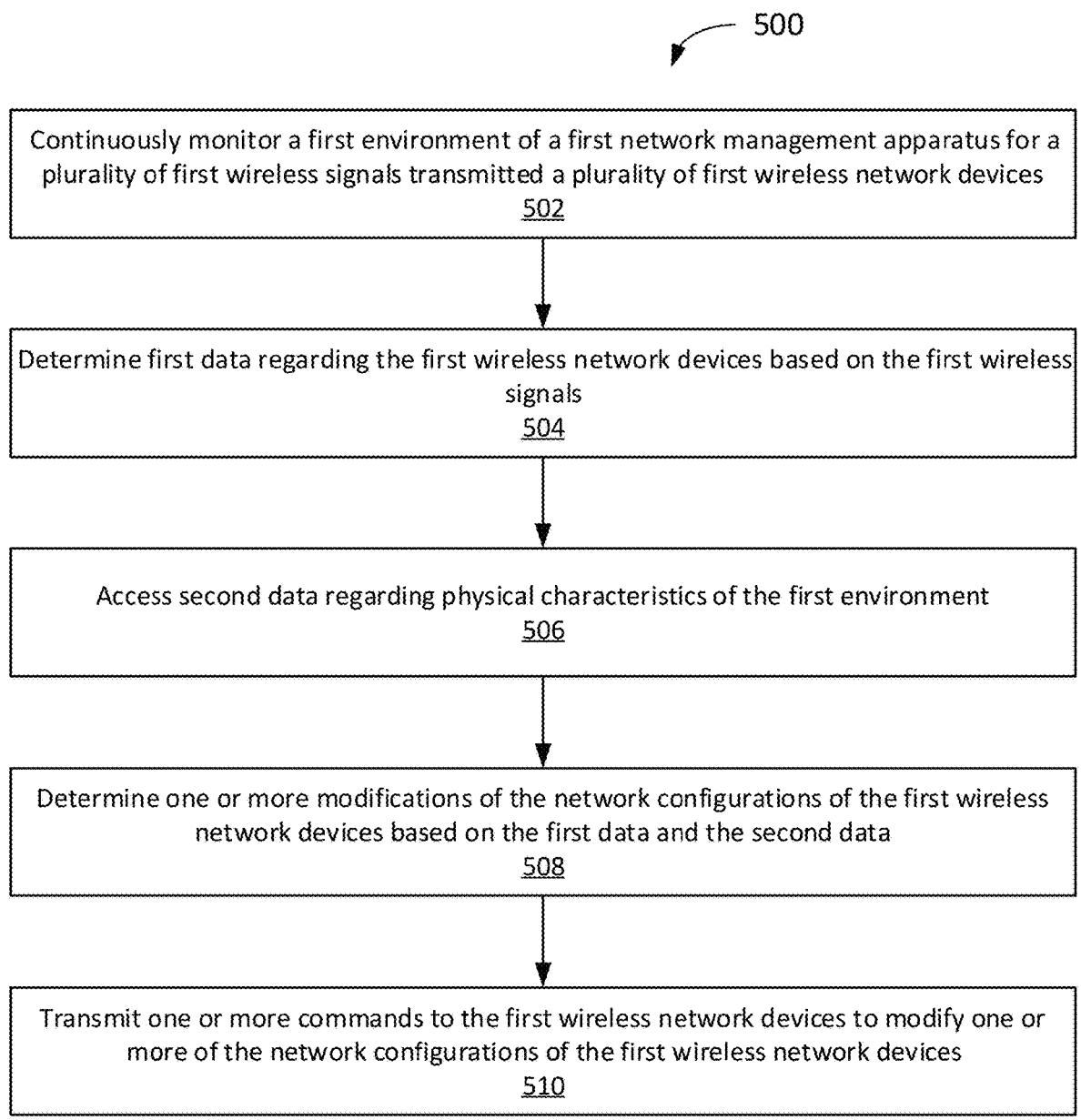
FIG. 5 is a flow chart diagram of example process for managing devices on a wireless communications network.

An example process 500 for managing devices on a wireless communications network is shown in FIG. 5. In some implementations, the process 500 can be performed by the systems described in this disclosure (for example, the system 100, such as the wireless network management system 150 shown and described with respect to FIGS. 1 and 2) using one or more processors (for example, using the processor or processors 610 shown in FIG. 6).

In some implementations, the process 500 can be performed by a first network management apparatus that is embodied as a computer appliance. For example, the first network management apparatus can include a first housing, a first wireless transceiver secured to the first housing, one or more first processors disposed within the first housing, and one or more first non-transitory computer readable media disposed in the first housing. The one or more first non-transitory computer readable media can store first instructions that, when executed by the one or more first processors, cause the one or more first processors to perform at least a portion of the process 500. In some implementations, the network management apparatus can be configured to perform at least a portion of the process 500 upon being switched on.

According to the process 500, the first network management apparatus uses a first wireless transceiver to continuously monitor a first environment of the first network management apparatus for a plurality of first wireless signals (block 502). The first wireless signals are transmitted by a plurality of first wireless network devices in the first environment. As an example, the first wireless network device can include one or more of the devices in the system 100 (for example, as shown in FIG. 1) and/or one or more of the wireless devices 218 (for example, as shown in FIG. 2).

In some implementations, at least one of the first wireless network devices is an Internet of Things (IoT) or an Industrial Internet of Things (IIoT) device. In some implementations, at least one of the first wireless network devices can be communicatively coupled to industrial machinery. Further, in some implementations, the first environment can be an industrial facility.

The first network management apparatus determines, based on the first wireless signals, first data regarding the first wireless network devices (block 504). The first data includes, for each of the first wireless network devices, an identifier of the first wireless network device, a location of the first wireless network device in the first environment, and a network configuration of the first wireless network device.

In some implementations the first data can also include, for each of the first wireless network devices, an antenna configuration of the first wireless network device. The antenna configuration of the first wireless network device can include at least one of a direction of an antenna of the first wireless network device, or a height of the antenna of the first wireless network device.

In some implementations, the network configuration of each of the first wireless network devices can include at least one of a network address of the first wireless network device, a wireless operating frequency of the first wireless network device, or a wireless operating channel of the first wireless network device.

The first network management apparatus also accesses second data regarding physical characteristics of the first environment (block 506). In some implementations, the second data can include at least one of a location of a physical structure in the first environment, one or more physical dimensions of the physical structure, or an orientation of the physical structure. The physical structure can be at least one of a wall, a floor, a ceiling, a pipe, a window, an item of furniture, or machinery.

The first network management apparatus determines, based on the first data and the second data, one or more modifications of the network configurations of the first wireless network devices (block 508).

The first network management apparatus transmits, to the first wireless network devices, one or more commands to modify one or more of the network configurations of the first wireless network devices (block 510).

In some implementations, the process 500 can also include determining whether one of the first wireless network devices is in a line of sight of another one of the first wireless network devices, and in response, presenting a notification to a user to move at least one of those first wireless network devices.

In some implementations, the process 500 can also include determining, for each of the first wireless network devices, respective distances between the first wireless network device and one or more other ones of the first wireless network devices, and in response, presenting a notification to a user to move at least one of the first wireless network devices.

In some implementations, the process 500 can also include presenting a network map to a user. The network map can include a three-dimensional graphical representation of the first environment, and a graphical representation of the location of each of the first wireless network devices in the first environment. In some implementations, the network map can also include a graphical representation of at least a portion of the network configuration of each of the first wireless network devices.

In some implementations, the first network management apparatus can include one or more antennas modules communicatively coupled to the wireless transceiver. The one or more antennas modules can be configured to detect first wireless signals in the first environment, and provide an indication of the first wireless signals to the first wireless transceiver. In some implementations, at least some of the one or more antennas modules are remote from the first network management apparatus. In some implementations, at least some of the one or more antennas modules can be secured to the first housing of the first network management apparatus.

In some implementations, a system can include multiple network management apparatuses, each configured to perform at least some of the process 500, either individually or in conjunction with one another.

For example, a system can include a second network management apparatus that includes a second housing, a second wireless transceiver secured to the second housing and comprising one or more second antennas, one or more second processors disposed within the second housing, and one or more second non-transitory computer readable media disposed in the second housing. The one or more second non-transitory computer readable media can store second instructions that, when executed by the one or more processors, cause the one or more second processors to perform a process similar to the process 500, with respect to second wireless network devices in a second environment.

For example, the second network management can use a second wireless transceiver to continuously monitor a second environment of the second network management apparatus for a plurality of second wireless signals. The second wireless signals can be transmitted by a plurality of second wireless network devices in the second environment, and the first environment can be different from the second environment.

The second network management determines, based on the second wireless signals, third data regarding the second wireless network devices. The third data can include, for each of the second wireless network devices, an identifier of the second wireless network device, a location of the second wireless network device in the second environment, and a network configuration of the second wireless network device;

The second network management also accesses fourth data regarding physical characteristics of the second environment.

Further, the second network management determines, based on the third data and the fourth data, one or more modifications of the network configurations of the second wireless network devices.

Further, the second network management transmits, to the second wireless network devices, one or more second commands to modify one or more of the network configurations of the second wireless network devices.

In some implementations, the system can also include a control system remote from the first network management apparatus and the second network management apparatus. In some implementations, the control system can be similar to the regional wireless network management system 402 (for example, as shown in FIG. 4).

The control system can be communicatively coupled to the first network management apparatus and the second network management apparatus. Further, the control system is configured to control an operation of the first wireless network devices and/or the second wireless network devices.

For example, the control system can receive the first data and the second data from the first network management apparatus and receive the third data and fourth second data from the second network management apparatus. The controls system can determine, based on the first data and the second data, one or more additional modifications of the network configurations of the first wireless network devices, and transmit, to the first network management apparatus, one or more additional commands to modify one or more of the network configurations of the first wireless network devices. Further, the control system can determine, based on the third data and the fourth data, one or more additional modifications of the network configurations of the second wireless network devices, and transmit, to the second network management apparatus, one or more additional commands to modify one or more of the network configurations of the second wireless network devices.

In some implementations, the system can include a time server communicatively coupled to the first network management apparatus and to the first wireless network devices. The time server can be configured to provide a clock signal for synchronizing operations of the first network management apparatus and the first wireless network devices.

Example Systems

Some implementations of the subject matter and operations described in this specification can be implemented in digital electronic circuitry, or in computer software, firmware, or hardware, including the structures disclosed in this specification and their structural equivalents, or in combinations of one or more of them. For example, in some implementations, one or more components of the system 100 and wireless network management system 150 can be implemented using digital electronic circuitry, or in computer software, firmware, or hardware, or in combinations of one or more of them. In another example, the process 500 shown in FIG. 5 can be implemented using digital electronic circuitry, or in computer software, firmware, or hardware, or in combinations of one or more of them.

Some implementations described in this specification can be implemented as one or more groups or modules of digital electronic circuitry, computer software, firmware, or hardware, or in combinations of one or more of them. Although different modules can be used, each module need not be distinct, and multiple modules can be implemented on the same digital electronic circuitry, computer software, firmware, or hardware, or combination thereof.

Some implementations described in this specification can be implemented as one or more computer programs, that is, one or more modules of computer program instructions, encoded on computer storage medium for execution by, or to control the operation of, data processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (for example, multiple CDs, disks, or other storage devices).

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, for example, an FPGA (field programmable gate array) or an ASIC (application specific integrated circuit). The apparatus can also include, in addition to hardware, code that creates an execution environment for the computer program in question, for example, code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages. A computer program may, but need not, correspond to a file in a file system. A program can be stored in a portion of a file that holds other programs or data (for example, one or more scripts stored in a markup language document), in a single file dedicated to the program in question, or in multiple coordinated files (for example, files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can also be implemented as, special purpose logic circuitry, for example, an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read only memory or a random access memory or both. A computer includes a processor for performing actions in accordance with instructions and one or more memory devices for storing instructions and data. A computer can also include, or be operatively coupled to receive data from or transfer data to, or both, one or more mass storage devices for storing data, for example, magnetic, magneto optical disks, or optical disks. However, a computer need not have such devices. Devices suitable for storing computer program instructions and data include all forms of non-volatile memory, media and memory devices, including by way of example semiconductor memory devices (for example, EPROM, EEPROM®, AND flash memory devices), magnetic disks (for example, internal hard disks, and removable disks), magneto optical disks, and CD-ROM and DVD-ROM® disks. The processor and the memory can be supplemented by, or incorporated in, special purpose logic circuitry.

To provide for interaction with a user, operations can be implemented on a computer having a display device (for example, a monitor, or another type of display device) for displaying information to the user. The computer can also include a keyboard and a pointing device (for example, a mouse, a trackball, a tablet, a touch sensitive screen, or another type of pointing device) by which the user can provide input to the computer. Other kinds of devices can be used to provide for interaction with a user as well. For example, feedback provided to the user can be any form of sensory feedback, such as visual feedback, auditory feedback, or tactile feedback. Input from the user can be received in any form, including acoustic, speech, or tactile input. In addition, a computer can interact with a user by sending documents to and receiving documents from a device that is used by the user. For example, a computer can send webpages to a web browser on a user's client device in response to requests received from the web browser.

A computer system can include a single computing device, or multiple computers that operate in proximity or generally remote from each other and typically interact through a communication network. Examples of communication networks include a local area network ("LAN") and a wide area network ("WAN"), an inter-network (for example, the Internet), a network including a satellite link, and peer-to-peer networks (for example, ad hoc peer-to-peer networks). A relationship of client and server can arise by virtue of computer programs running on the respective computers and having a client-server relationship to each other.

Figure 6:
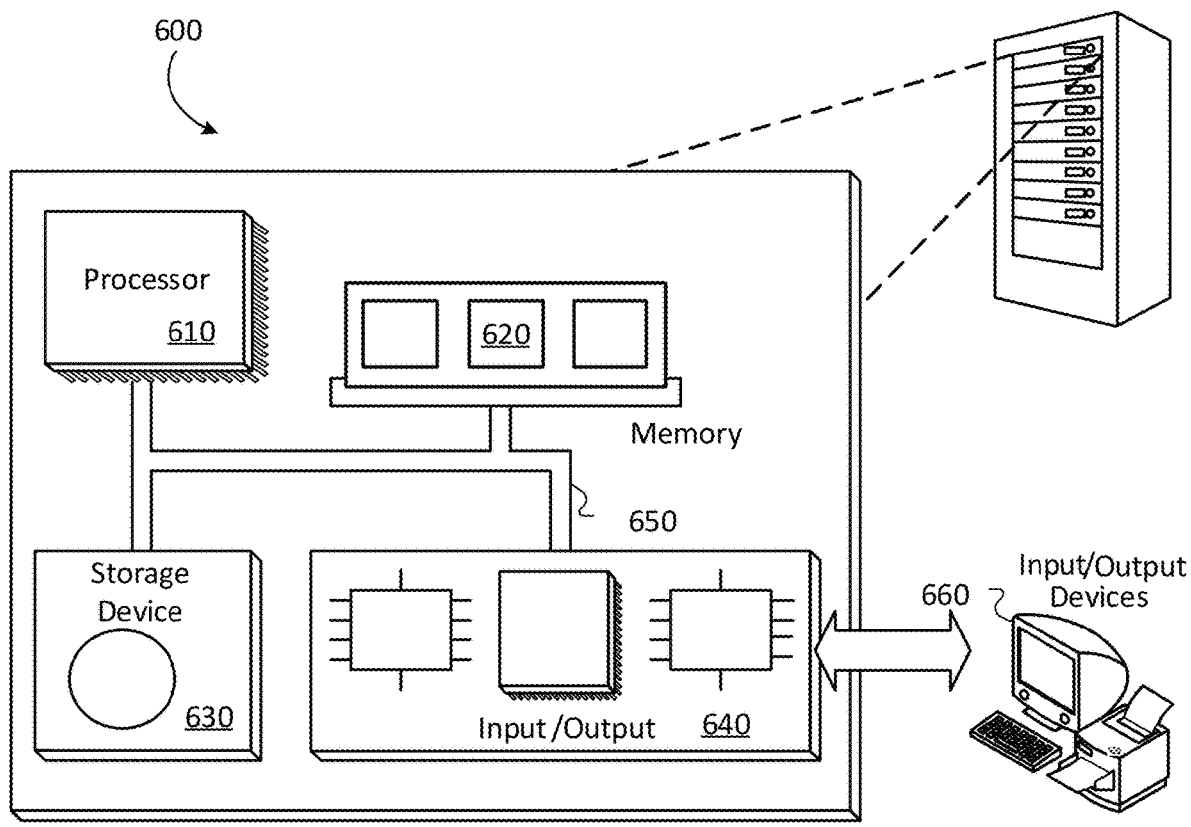
FIG. 6 is a schematic diagram of an example computer system.

FIG. 6 shows an example computer system 600 that includes a processor 610, a memory 620, a storage device 630 and an input/output device 640. Each of the components 610, 620, 630 and 640 can be interconnected, for example, by a system bus 650. The processor 610 is capable of processing instructions for execution within the system 600. In some implementations, the processor 610 is a single-threaded processor, a multi-threaded processor, or another type of processor. The processor 610 is capable of processing instructions stored in the memory 620 or on the storage device 630. The memory 620 and the storage device 630 can store information within the system 600.

The input/output device 640 provides input/output operations for the system 600. In some implementations, the input/output device 640 can include one or more of a network interface device, for example, an Ethernet card, a serial communication device, for example, an RS-232 port, or a wireless interface device, for example, an 802.11 card, a 3G wireless modem, a 4G wireless modem, or a 5G wireless modem, or both. In some implementations, the input/output device can include driver devices configured to receive input data and send output data to other input/output devices, for example, keyboard, printer and display devices 660. In some implementations, mobile computing devices, mobile communication devices, and other devices can be used.

While this specification contains many details, these should not be construed as limitations on the scope of what may be claimed, but rather as descriptions of features specific to particular examples. Certain features that are described in this specification in the context of separate implementations can also be combined. Conversely, various features that are described in the context of a single implementation can also be implemented in multiple embodiments separately or in any suitable sub-combination.

A number of embodiments have been described. Nevertheless, various modifications can be made without departing from the spirit and scope of the invention. Accordingly, other embodiments are within the scope of the claims.

What is claimed is:

1. A system comprising:
  a first network management apparatus comprising:
    a first housing,
    a first wireless transceiver secured to the first housing,
    one or more first processors disposed within the first housing, and
    one or more first non-transitory computer readable media disposed in the first housing, wherein the one or more first non-transitory computer readable media store first instructions that, when executed by the one or more first processors, cause the one or more first processors to perform operations comprising:
      continuously monitoring, using the first wireless transceiver, a first environment of the first network management apparatus for a plurality of first wireless signals, wherein the first wireless signals are transmitted by a plurality of first wireless network devices in the first environment,
      determining, based on the first wireless signals, first data regarding the plurality of first wireless network devices, wherein the first data comprises, for each of the plurality of first wireless network devices:
        an identifier of the first wireless network device,
        a location of the first wireless network device in the first environment,
        a network configuration of the first wireless network device, and
        an antenna configuration of the first wireless network device;
      accessing second data regarding physical characteristics of the first environment;
      determining, based on the first data and the second data, one or more modifications of the network configurations of the plurality of first wireless network devices;
      transmitting, to the plurality of first wireless network devices, one or more commands to modify one or more of the network configurations of the plurality of first wireless network devices;

determining whether one of the plurality of first wireless network devices is in a line of sight of another one of the plurality of first wireless network devices, and responsive to determining whether the one of the plurality of first wireless network devices is in a line of sight of another one of the plurality of first wireless network devices, presenting a notification to a user, wherein the notification comprises a step by step set of instructions to the user to relocate at least one of those first wireless network devices from a first location to a second location.

2. The system of claim 1, wherein the first network management apparatus is configured to automatically perform at least some of the operations upon being switched on.

3. The system of claim 1, wherein the first network management apparatus is an appliance.

4. The system of claim 1, wherein the network configuration of each of the plurality of first wireless network devices comprises at least one of:
a network address of the first wireless network device,
a wireless operating frequency of the first wireless network device, or
a wireless operating channel of the first wireless network device.

5. The system of claim 1, wherein the antenna configuration of the first wireless network device comprises at least one of:
a direction of an antenna of the first wireless network device, or
a height of the antenna of the first wireless network device.

6. The system of claim 1, wherein the second data comprises at least one of:
a location of a physical structure in the first environment,
one or more physical dimensions of the physical structure, or
an orientation of the physical structure.

7. The system of claim 6, wherein the physical structure is at least one of a wall, a floor, a ceiling, a pipe, a window, an item of furniture, or machinery.

8. The system of claim 1, the operations further comprising:
determining, for each of the plurality of first wireless network devices, respective distances between the first wireless network device and one or more other ones of the plurality of first wireless network devices, and
responsive to determining the distances, presenting a second notification to a user to move at least one of the plurality of first wireless network devices.

9. The system of claim 1, the operations further comprising:
presenting a network map to a user, wherein the network map comprises:
a three-dimensional graphical representation of the first environment, and
a graphical representation of the location of each of the plurality of first wireless network devices in the first environment.

10. The system of claim 9, wherein the network map further comprises:
a graphical representation of at least a portion of the network configuration of each of the plurality of first wireless network devices.

11. The system of claim 1, further comprising:
one or more antennas modules communicatively coupled to the wireless transceiver, wherein the one or more antennas modules are configured to:
detect first wireless signals in the first environment, and
provide an indication of the first wireless signals to the first wireless transceiver.

12. The system of claim 11, wherein at least some of the one or more antennas modules are remote from the first network management apparatus.

13. The system of claim 11, wherein at least some of the one or more antennas modules are secured to the first housing of the first network management apparatus.

14. The system of claim 1, wherein at least one of the plurality of first wireless network devices is an Internet of Things (IoT) or an Industrial Internet of Things (IIoT) device.

15. The system of claim 1, wherein at least one of the plurality of first wireless network devices is communicatively coupled to industrial machinery.

16. The system of claim 1, wherein the first environment is an industrial facility.

17. The system of claim 1, further comprising:
a second network management apparatus comprising:
a second housing,
a second wireless transceiver secured to the second housing and comprising one or more second antennas,
one or more second processors disposed within the second housing, and
one or more second non-transitory computer readable media disposed in the second housing, wherein the one or more second non-transitory computer readable media store second instructions that, when executed by the one or more processors, cause the one or more second processors to perform second operations comprising:
continuously monitoring, using the second wireless transceiver, a second environment of the second network management apparatus for a plurality of second wireless signals, wherein the second wireless signals are transmitted by a plurality of second wireless network devices in the second environment, and wherein the first environment is different from the second environment,
determining, based on the second wireless signals, third data regarding the second wireless network devices, wherein the third data comprises, for each of the second wireless network devices:
an identifier of the second wireless network device,
a location of the second wireless network device in the second environment,
a network configuration of the second wireless network device, and
an antenna configuration of the second wireless network device;
accessing fourth data regarding physical characteristics of the second environment;
determining, based on the third data and the fourth data, one or more modifications of the network configurations of the second wireless network devices; and
transmitting, to the second wireless network devices, one or more second commands to modify one or more of the network configurations of the second wireless network devices.

18. The system of claim 17, further comprising:

a control system remote from the first network management apparatus and the second network management apparatus, wherein the control system is communicatively coupled to the first network management apparatus and the second network management apparatus, and wherein the control system is configured to:

receive the first data and the second data from the first network management apparatus, receive the third data and fourth second data from the second network management apparatus, determine, based on the first data and the second data, one or more additional modifications of the network configurations of the plurality of first wireless network devices, transmit, to the first network management apparatus, one or more additional commands to modify one or more of the network configurations of the plurality of first wireless network devices, determine, based on the third data and the fourth data, one or more additional modifications of the network configurations of the second wireless network devices, and transmit, to the second network management apparatus, one or more additional commands to modify one or more of the network configurations of the second wireless network devices.

19. The system of claim 1, further comprising a time server communicatively coupled to the first network management apparatus and to the plurality of first wireless network devices, wherein the time server is configured to provide a clock signal for synchronizing operations of the first network management apparatus and the plurality of first wireless network devices.

\* \* \* \* \*